(12) United States Patent
Akutsu et al.

(10) Patent No.: US 9,722,274 B2
(45) Date of Patent: Aug. 1, 2017

(54) MANUFACTURING METHOD AND MANUFACTURING DEVICE OF SECONDARY BATTERY

(71) Applicants: NISSAN MOTOR CO., LTD., Yokohama-shi, Kanagawa (JP); AUTOMOTIVE ENERGY SUPPLY CORPORATION, Zama-shi, Kanagawa (JP)

(72) Inventors: Nobuaki Akutsu, Machida (JP); Masaaki Tsukano, Atsugi (JP); Akira Okahata, Yokohama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 127 days.

(21) Appl. No.: 14/405,628

(22) PCT Filed: May 13, 2013

(86) PCT No.: PCT/JP2013/063262
§ 371 (c)(1),
(2) Date: Dec. 4, 2014

(87) PCT Pub. No.: WO2013/187161
PCT Pub. Date: Dec. 19, 2013

(65) Prior Publication Data
US 2015/0171461 A1 Jun. 18, 2015

(30) Foreign Application Priority Data
Jun. 11, 2012 (JP) .................................. 2012-131878

(51) Int. Cl.
*H01M 10/04* (2006.01)
*H01M 2/02* (2006.01)
(Continued)

(52) U.S. Cl.
CPC ......... *H01M 10/04* (2013.01); *H01M 2/0207* (2013.01); *H01M 2/0287* (2013.01);
(Continued)

(58) Field of Classification Search
CPC ............ H01M 10/04; H01M 10/0404; H01M 10/0431; H01M 10/049; H01M 2/0207;
(Continued)

(56) References Cited

U.S. PATENT DOCUMENTS

| 2006/0216591 A1* | 9/2006 | Lee | ........................ H01M 2/021 429/175 |
| 2007/0072071 A1* | 3/2007 | Lee | ........................ H01M 2/021 429/162 |

(Continued)

FOREIGN PATENT DOCUMENTS

| EP | 2237345 A1 | 10/2010 |
| JP | 2004-342520 A | 12/2004 |

(Continued)

*Primary Examiner* — Carlos Barcena
(74) *Attorney, Agent, or Firm* — Young Basile Hanlon & MacFarlane, P.C.

(57) ABSTRACT

A manufacturing method of a secondary battery includes a first sealing process that stores a power generation element inside an exterior body formed by overlapped exterior films and that seals the exterior body at a first sealing part, the power generation element being arranged with a space from at least a part of the first sealing part, a conditioning process that performs conditioning, an hole forming process that forms a degassing hole between the first sealing part and the power generation element, and a second sealing process that seals the degassing hole, in which the hole forming process includes a pressing process that presses, from both sides of the exterior body, a portion where the degassing hole is formed in the exterior body so that the overlapped exterior films are brought into contact with each other, before the degassing hole is formed in the exterior body.

11 Claims, 11 Drawing Sheets

(51) Int. Cl.
    *H01M 2/36*      (2006.01)
    *H01M 2/08*      (2006.01)
(52) U.S. Cl.
    CPC ....... *H01M 2/365* (2013.01); *H01M 10/0404* (2013.01); *H01M 10/049* (2013.01); *H01M 2/0212* (2013.01); *H01M 2/08* (2013.01); *Y10T 29/4911* (2015.01)
(58) Field of Classification Search
    CPC .... H01M 2/0212; H01M 2/0287; H01M 2/08; H01M 2/12; H01M 2/1223; H01M 2/365
    See application file for complete search history.

(56) References Cited

U.S. PATENT DOCUMENTS

| | | |
|---|---|---|
| 2009/0098443 A1 | 4/2009 | Yamamoto et al. |
| 2009/0253038 A1* | 10/2009 | Segawa et al. ..... H01M 4/8631 429/210 |
| 2012/0034510 A1 | 2/2012 | Kitaura |
| 2013/0244093 A1 | 9/2013 | Min et al. |

FOREIGN PATENT DOCUMENTS

| | | | |
|---|---|---|---|
| JP | 2011070983 A | 4/2011 | |
| KR | WO 2012074217 A2 * | 6/2012 | ............ H01M 2/361 |
| WO | 2012074212 A2 | 6/2012 | |

* cited by examiner

MANUFACTURING METHOD AND MANUFACTURING DEVICE OF SECONDARY BATTERY

CROSS REFERENCE TO RELATED APPLICATION

The present application claims priority to Japanese Patent Application No. 2012-131878, filed in the Japan Patent Office on Jun. 11, 2012. The contents of this application are incorporated herein by reference in their entirety.

TECHNICAL FIELD

The present invention relates to manufacturing methods and manufacturing devices of secondary batteries, each having an exterior body formed by a thin and lightweight exterior film, such as a laminate film, and, more particularly, to a manufacturing method and a manufacturing device of a secondary battery that is suited for preventing liquid leakage at the time of degassing gas generated by a conditioning process and the like.

BACKGROUND ART

According to a manufacturing method of a secondary battery that has been proposed conventionally (refer to JP2004-342520A), it is possible to certainly perform degassing, after conditioning and the like, of the secondary battery having an exterior body formed by a thin and lightweight exterior film, such as a laminate film, and to sufficiently secure sealability after the degassing.

This includes an enclosing process that encloses a power generation element in the exterior body by joining an opening part of the exterior film while forming an unjoined part that communicates with the inside and that is separated from the outside, a degassing process that forms a degassing hole while limiting the thickness of the unjoined part to the predetermined thickness or less, and a second sealing process that encloses the power generation element by joining the unjoined part. As a method of suppressing swelling of the unjoined part and relaxing stress concentration, the thickness of the unjoined part is controlled when an internal pressure of the exterior body is high. This prevents the unjoined part from returning to its original shape at the time of joining, as the large swelling or deformation is caused at the unjoined part due to the increase in the internal pressure by generated gas, and prevents a part of the joined part from being separated, as the stress concentrates in the vicinity of the unjoined part due to the swelling of the unjoined part.

SUMMARY OF INVENTION

In the degassing process for discharging the generated gas to the outside, according to the above-described conventional example, a bulge due to the internal pressure is controlled and at the same time, the degassing hole is formed in the unjoined part. However, when an electrolytic solution remains in the unjoined part, the electrolytic solution, remaining in the unjoined part, jumps out through the opened degassing hole to the outside, together with the gas. This causes such a disadvantage that a containing amount of the electrolytic solution is reduced. In addition, when the jumped-out electrolytic solution is attached to the surface of the exterior body, a wiping process is required, which causes such a disadvantage that an increase in the manufacturing costs is caused.

The present invention is made in view of the above-described disadvantages, and an object of the present invention is to provide a manufacturing method and a manufacturing device of a secondary battery that is suited for preventing liquid leakage at the time of degassing.

According to an aspect of the manufacturing method of the secondary battery of the present invention, provided is a manufacturing method of a secondary battery including a first sealing process that stores a power generation element inside an exterior body formed by overlapped exterior films and that seals the exterior body at a first sealing part, the power generation element being arranged with a space from at least a part of the first sealing part, a conditioning process that performs conditioning of the power generation element, an hole forming process that forms a degassing hole between the first sealing part and the power generation element, and a second sealing process that seals the degassing hole. The hole forming process includes a pressing process that presses, from both sides of the exterior body, a portion where the degassing hole is formed in the exterior body so that the overlapped exterior films are brought into contact with each other, before the degassing hole is formed in the exterior body.

Embodiments, advantages of the present invention will be explained in detail with reference to the attached drawings.

DESCRIPTION OF EMBODIMENTS

Hereinafter, a manufacturing method and a manufacturing device of a secondary battery according to the present invention will be explained based on respective embodiments.

First embodiment

The secondary battery, to which the manufacturing method of the secondary battery according to the present invention is applied, is a battery provided with an exterior body that is formed by a thin and lightweight exterior film.

The thin and lightweight exterior film is, for example, a polymer-metal composite laminate film having a three-layer structure, and is provided with a metal layer and polymer resin layers arranged on both surfaces of the metal layer. The metal layer is formed by metal foil of aluminum, stainless steel, nickel, copper or the like, for example. The polymer resin layers are formed by a heat-welding resin film of polyethylene, polypropylene, modified polyethylene, modified polypropylene, ionomer, ethylene vinyl acetate or the like, for example. It is preferable that the exterior film is easily adhered by heat welding and ultrasonic welding, and has superior airtightness and water impermeability.

Figure 1:
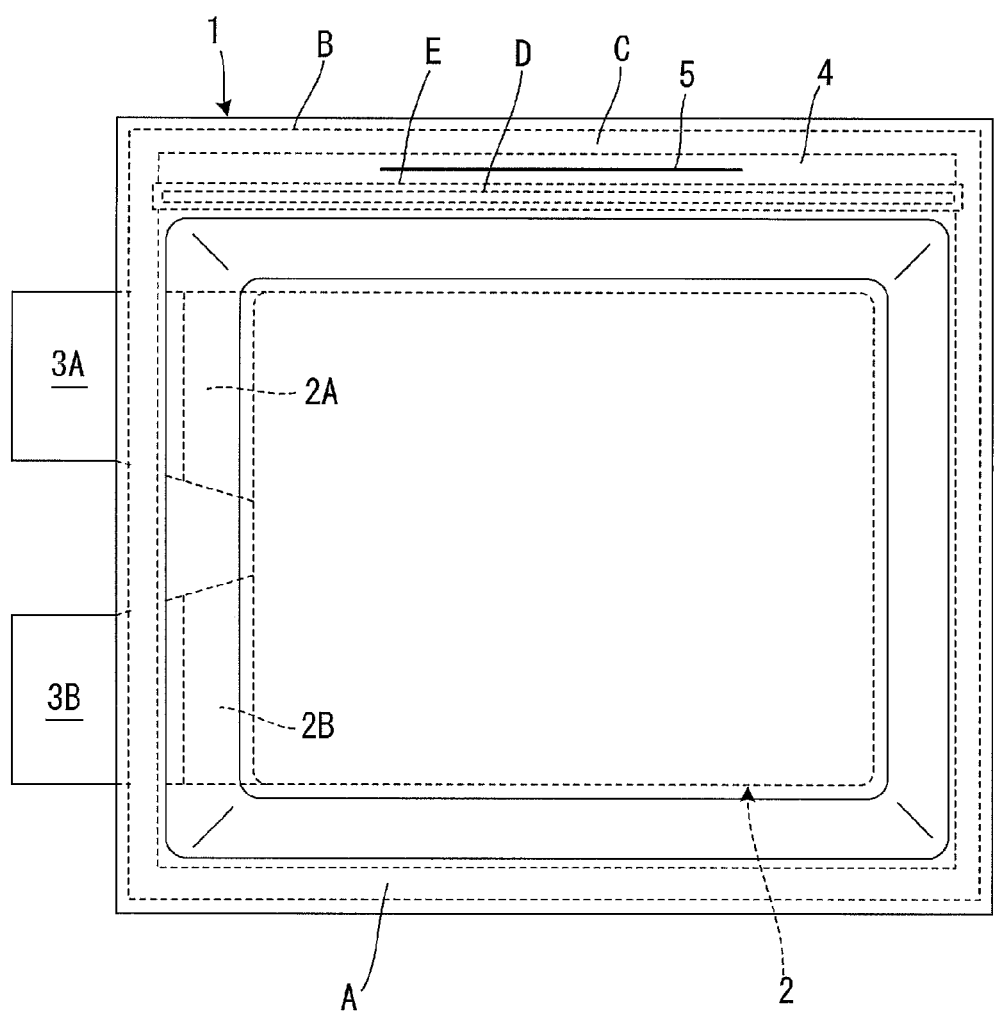
FIG. 1 is a schematic plan view of a secondary battery, to which a manufacturing method and a manufacturing device of a secondary battery, according to an embodiment of the present invention, is applied.

As illustrated in FIG. 1, three peripheries of the exterior films, housing a power generation element 2 of the secondary battery, are joined in a "U shape" at a fusion part A, so as to form a bag, and an opening part B of the bag is joined by the heat welding while injecting an electrolytic solution inside the bag, so as to form an exterior body 1. The opening part B is joined by the heat welding by three steps, that is, at a first sealing part C by a first sealing process, at a second sealing part D and a practical sealing part E by a second sealing process and a practical sealing process, respectively, as will be described later.

An outline of the power generation element 2 of the secondary battery will be explained by using a lithium ion secondary battery as an example. The power generation element 2 of the lithium ion secondary battery has a positive electrode and a negative electrode piled up via a separator. Namely, the power generation element 2 is formed by laminating a positive electrode plate that is formed by a collector coated with a positive electrode active material layer, and a negative electrode plate that is formed by a collector coated with a negative electrode active material layer, via the separator. The lithium ion secondary battery, as a nonaqueous battery, generates gas by reaction of moisture that is trapped therein at the time of manufacture. In addition, it generates gas by evaporation of an organic solvent contained in the electrolytic solution, and by electrode reaction during conditioning after manufacturing the battery.

The positive electrode plate is provided with, for example, the collector formed by aluminum foil, and the positive electrode active material layer that is formed on regions on both surfaces, except for a tab region of the collector. FIG. 1 illustrates the state in which only a tab region 2A is pulled out to the outside of the power generation element 2. The positive electrode active material layer includes, for example, the positive electrode active material formed by a lithium-transition metal compound oxide such as LiMn2O4, a conductive assistant, a binder and the like.

The negative electrode plate is provided with, for example, the collector formed by copper foil, and the negative electrode active material layer that is formed on regions on the both surfaces, except for a tab region of the collector. FIG. 1 illustrates the state in which only a tab region 2B is pulled out to the outside of the power generation element 2. The negative electrode active material layer includes the negative electrode active material, the conductive assistant, the binder and the like. The negative electrode active material includes, for example, hard carbon (non-graphitizable carbon material), a graphite-based carbon material, and the lithium-transition metal compound oxide.

The separator is formed by, for example, polyolefin such as polyethylene, polypropylene or the like, polyamide, and polyimide.

A liquid electrolyte (electrolytic solution) includes an organic solvent, a supporting electrolyte and the like. For example, the organic solvent includes cyclic carbonates such as propylene carbonate (PC), ethylene carbonate (EC) or the like, chain carbonates such as dimethyl carbonate or the like, and ethers such as tetrahydrofuran or the like. The supporting electrolyte includes inorganic acid anion salt such as lithium salt (LiPF6), and organic acid anion salt such as $LiCF_3SO_3$.

The tab regions 2A and 2B of the collectors of the plurality of positive electrode plates and negative electrode plates have the same polarities. The same polarities are connected to each other in order to extract a current from the power generation element 2, and are connected to a positive electrode terminal 3A and a negative electrode terminal 3B, as illustrated in FIG. 1. Then, the positive electrode terminal 3A and the negative electrode terminal 3B are pulled out to the outside of the exterior body 1 via the fusion part A of the exterior body 1.

Figure 2:
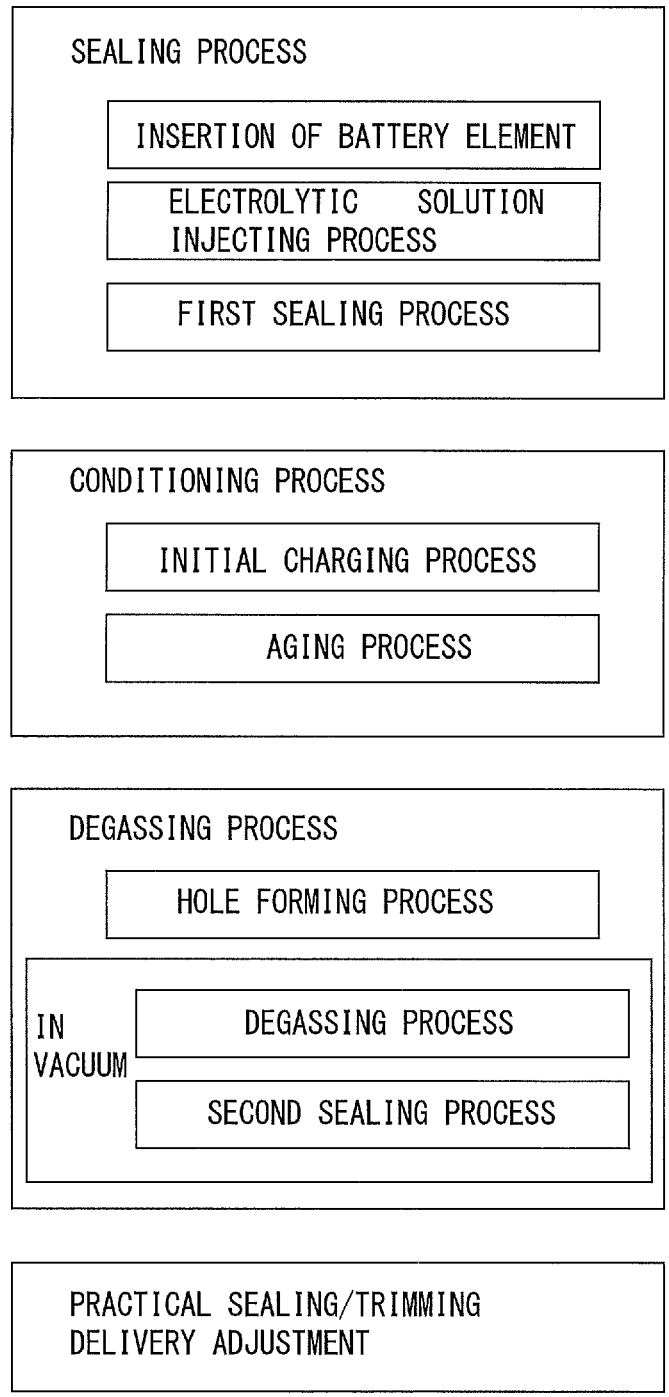
FIG. 2 is a process chart for explaining the manufacturing method of the secondary battery according to this embodiment.

FIG. 2 is a process chart for explaining the manufacturing method of the secondary battery according to this embodiment. The manufacturing method of the secondary battery according to this embodiment includes a sealing process, a conditioning process, a degassing process, a practical sealing/trimming process, and other processes that are performed as required. Hereinafter, the manufacturing method of the secondary battery according to this embodiment will be explained with reference to FIG. 2.

In the sealing process, the power generation element 2 having a rectangular shape is first arranged between the two exterior films, each having a substantially rectangular shape. The positive electrode terminal 3A and the negative electrode terminal 3B of the power generation element 2 are positioned to be exposed outside the exterior films. Thereafter, as illustrated in FIG. 1, the peripheries of the exterior films are joined in the "U shape" at the fusion part A, with one side being left unjoined, so as to form the bag, in which the one side serves as the opening part B.

In the electrolytic solution injecting process, the electrolytic solution is injected into the bag via the opening part B. The method of injecting the electrolytic solution is not particularly limited, and the electrolytic solution may be directly injected by inserting a tube or a nozzle through the opening part B, or may be injected by immersion in the electrolyte.

In the first sealing process, the opening part B, used for injecting the electrolytic solution, is joined, and the first sealing part C is formed, so as to seal the exterior body 1. As illustrated in FIG. 1, this first sealing part C is joined at the position closer to the periphery side of the exterior body 1. Namely, the joining is made at the position separated from the power generation element 2, so that a degassing part 4, communicating with the power generation element 2, is formed between the joining part and the power generation element 2.

In the conditioning process, an initial charging process and an aging process for stabilizing battery characteristics are performed. By the initial charging process, initial gas is generated from the power generation element 2. In addition, in the aging process, the gas is further generated from the power generation element 2. Incidentally, either one of the initial charging process and the aging process may suffice in the conditioning process, depending on the situation.

In the initial charging process, charging is made until the power generation element 2 generates a battery voltage of a predetermined ratio of a battery capacity of the power generation element 2, that is, for example, the battery voltage obtained when the charging is made to a full charge. Incidentally, it is preferable that the temperature of the initial charging is 45 to 70° C., since the generation of the gas is insufficient when the temperature is lower than 45° C., and deterioration in the battery characteristics may be caused when the temperature is higher than 70° C. The predetermined ratio of the battery capacity is selected according to needs.

In the aging process, the power generation element 2 is charged and kept.

In the degassing process, a hole forming process is performed in an atmosphere under atmospheric pressure, and then the degassing process and the second sealing process are performed in a decompressed vacuum.

In the hole forming process, a slit-like degassing hole 5 is formed by making an incision in the degassing part 4 of the first sealing part C, as illustrated in FIG. 1, so as to allow the degassing part 4 to communicate with the outside.

Figure 11A:
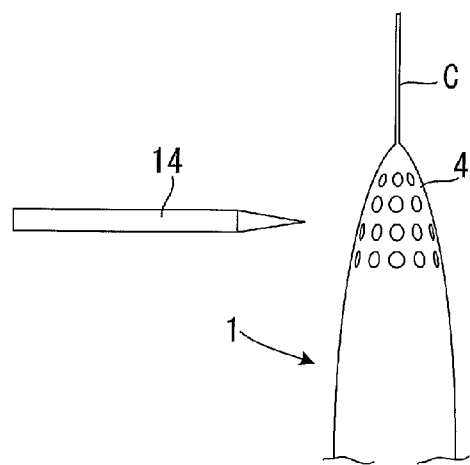
FIG. 11A is an explanatory diagram for explaining the state of the degassing hole before processing, according to a comparative example.
Figure 11B:
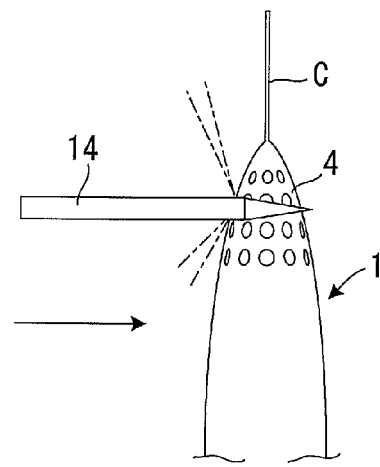
FIG. 11B is an explanatory diagram for explaining the state of the degassing hole after the processing, according to the comparative example.

According to a comparative example, when the electrolytic solution remains in the degassing part 4, as illustrated in FIG. 11A, the degassing hole 5 is formed by pressing the cutting edge of a cutter 14 against the corresponding portion, as illustrated in FIG. 11B. In the illustrated example, the degassing part 4 is slightly bulged due to an increase in an internal pressure by the gas. For this reason, the remaining electrolytic solution may jump out from the degassing hole 5 to the outside, as illustrated in FIG. 11B. When the electrolytic solution jumps to the outside of the exterior body 1 like this, the amount of the electrolytic solution remaining in the exterior body 1 is reduced, and a life of the battery is reduced.

Figure 11C:
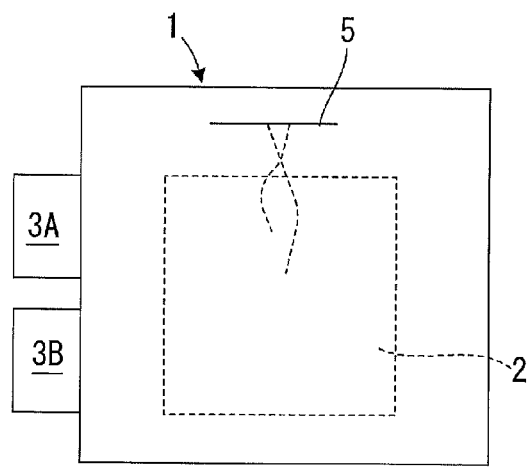
FIG. 11C is an explanatory diagram for explaining the state of the electrolytic solution that is attached after degassing, according to the comparative example.

In addition, the electrolytic solution, jumped to the outside of the exterior body 1, is attached to the surface of the exterior body 1, as illustrated in FIG. 11C. When the electrolytic solution is attached to the surface of the exterior body 1 like this, a wiping process is required as a new process, which causes such a disadvantage that an increase in manufacturing costs is caused. In addition, a failure to wipe the electrolytic solution causes such a disadvantage that an adhesive force of an adhesive is deteriorated when side surfaces of a plurality of secondary batteries are adhered to each other and used as a battery pack.

Figure 3:
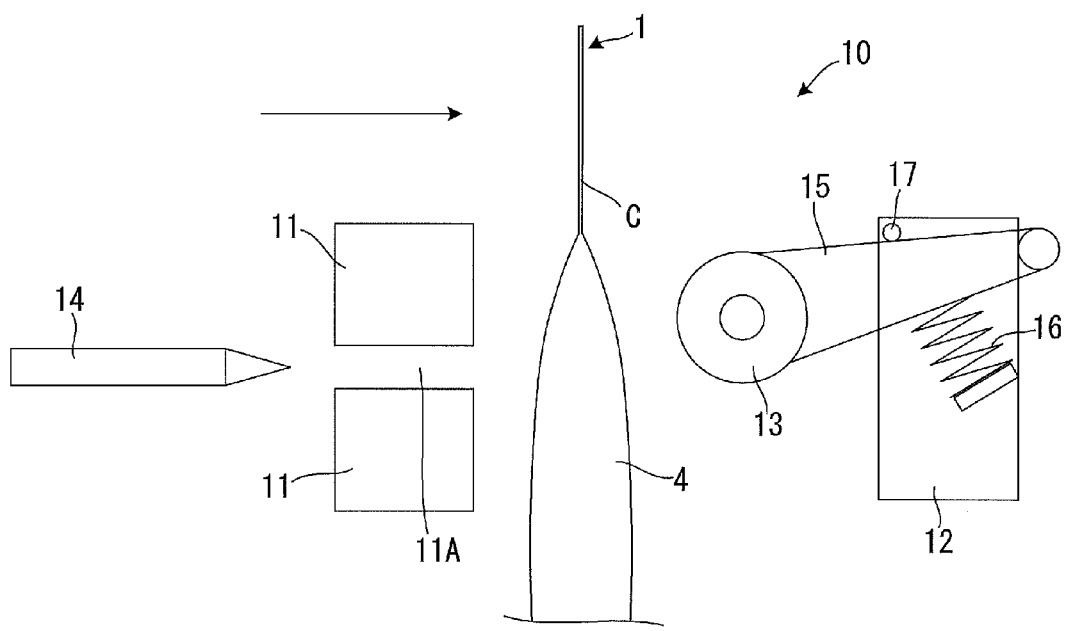
FIG. 3 is a side view of a hole forming device.
Figure 4:
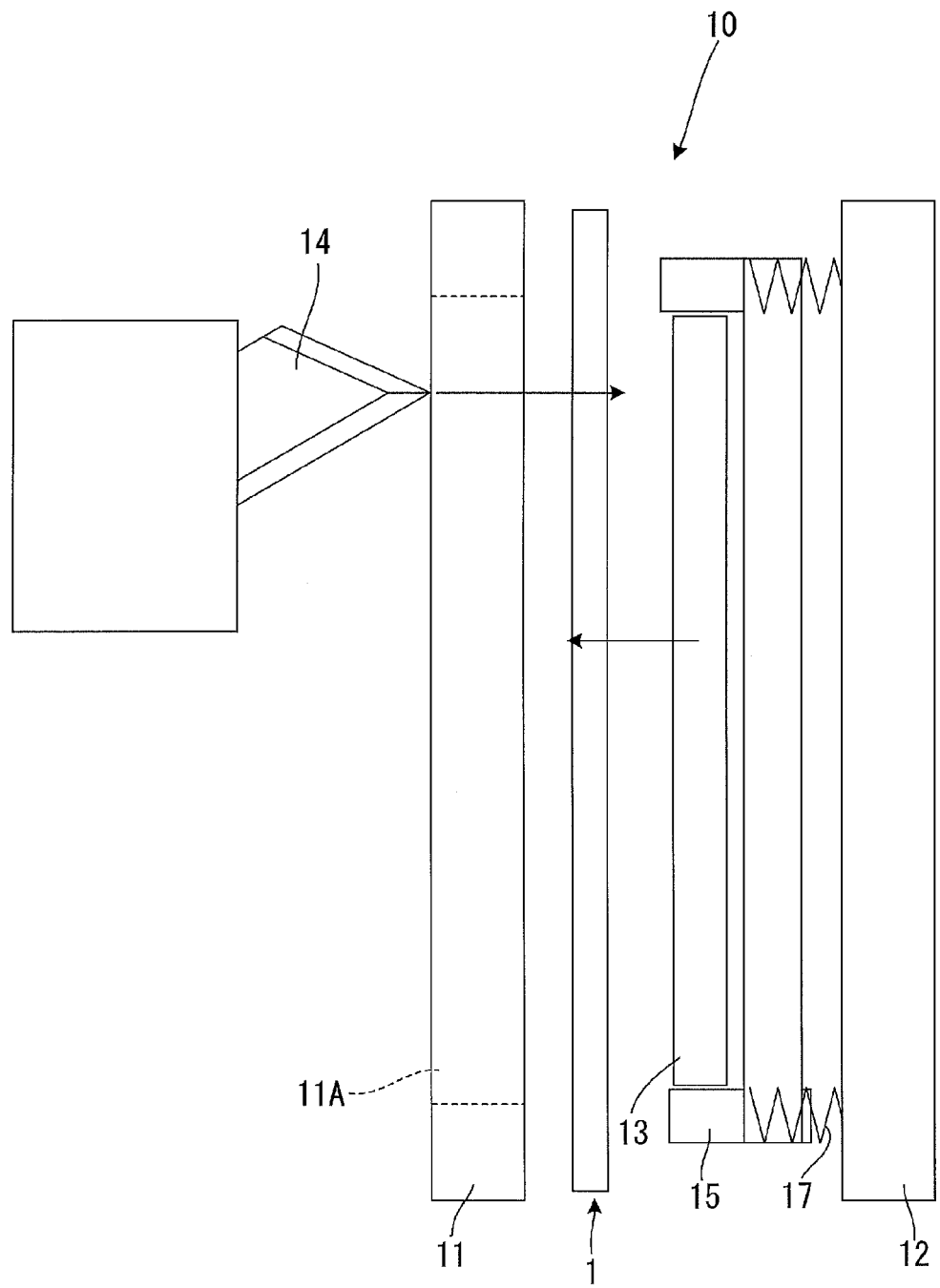
FIG. 4 is a plan view of the hole forming device.

According to this embodiment, a hole forming device 10 of a first example, as illustrated in FIGS. 3 and 4, is used in order to prevent the jumping out of the electrolytic solution in the hole forming process. The hole forming device 10 is provided with a locking pad 11 that supports one side of the degassing part 4 of the exterior body 1, a sandwiching body 12 that faces the other side of the degassing part 4 and that supports a roller 13 to be able to swing, and a cutter 14 that makes the incision in the degassing part 4 to form the degassing hole 5. It should be noted that the degassing part 4 is slightly bulged due to the increase in the internal pressure by the gas inside the exterior body 1.

The locking pad 11 and the sandwiching body 12 are configured to be able to move between standby positions where the locking pad 11 and the sandwiching body 12 are in a standby state and are separated from the degassing part 4 of the exterior body 1, and operation positions where the the locking pad 11 and the sandwiching body 12 are brought closer to each other, with the degassing part 4 being arranged therebetween, and clamp the degassing part 4. When the locking pad 11 is in the operation position, it is brought into contact with one surface of the degassing part 4.

Figure 5:
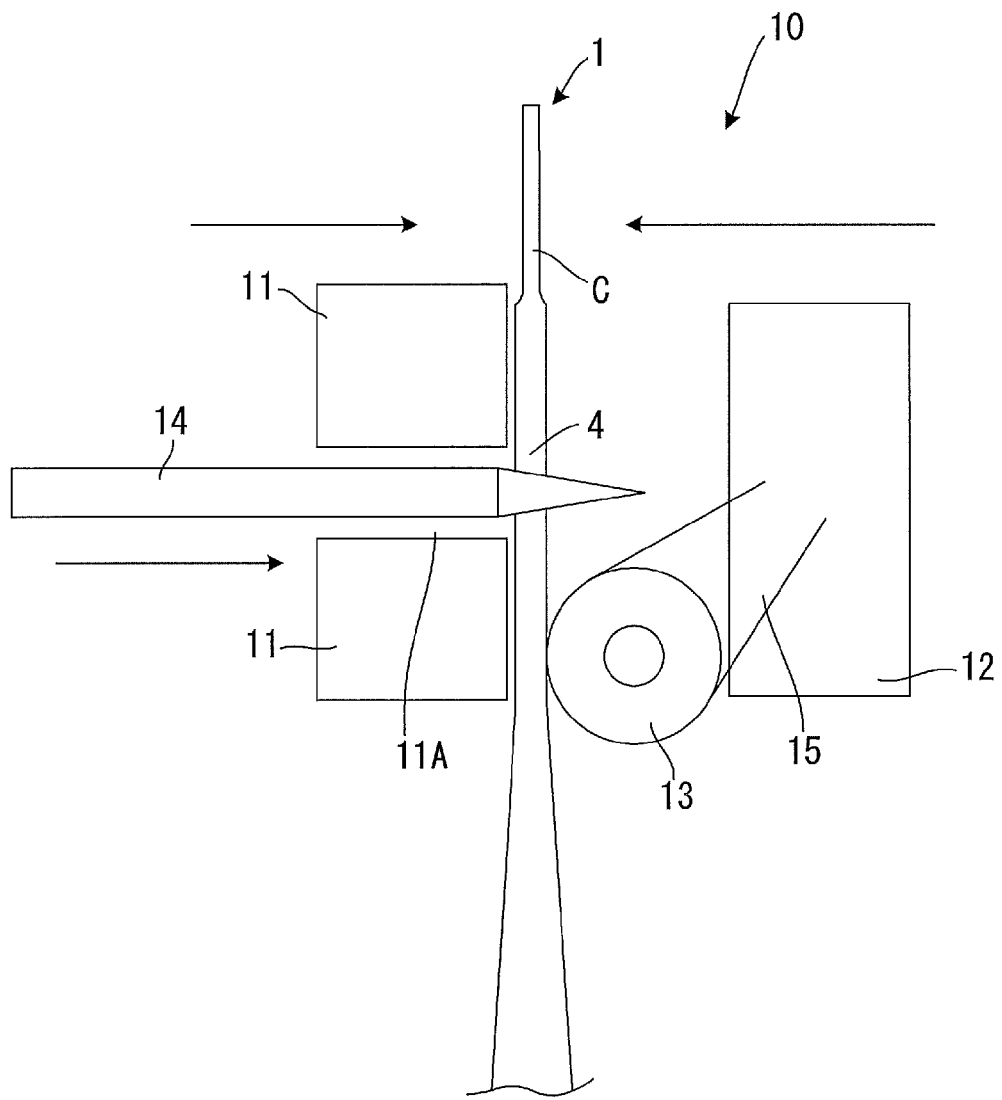
FIG. 5 is a side view for explaining an operation state of the hole forming device.

When the sandwiching body 12 is in the operation position, it causes the roller 13 to be brought into contact with the other surface of the degassing part 4, and causes the roller 13 to clamp the degassing part 4. As illustrated in FIG. 3, the roller 13 is supported by the sandwiching body 12 to be able to swing freely via an arm 15. A spring 16 causes the arm 15 to rotate upward, and biases the roller 13 to be separated from the sandwiching body 12. Thus, the arm 15 is abutted against a stopper 17, as a result of which the roller 13 is projected. When the sandwiching body 12 is moved to the operation position, the roller 13 is abutted against the degassing part 4 at the position separated from the power generation element 2, and sandwiches the slightly-bulged degassing part 4 of the exterior body 1 with the front surface of the locking pad 11, and, due to its reaction force, the arm 15 swings downward in the drawing against the spring 16. As a result of this, as illustrated in FIG. 5, the roller 13 at the tip rolls over the surface of the degassing part 4 of the exterior body 1, moves toward the power generation element 2 side and, accordingly, operates to squeeze the slightly-bulged degassing part 4 of the exterior body 1 toward the power generation element 2 side by the roller 13.

When the cutter 14 is in the standby position, it is arranged behind the locking pad 11. The cutter 14 can penetrate through a through hole 11A as a lateral slit provided in the locking pad 11, and move to the operation position where the cutting edge is projected in front of the locking pad 11. Further, when the cutter 14 is in the operation position, it can cause the cutting edge to move laterally along the through hole 11A. Thereby, the degassing hole 5 can be formed in the degassing part 4 within a region supported by the locking pad 11. After the locking pad 11 and the sandwiching body 12 move to the operation positions, sandwich the degassing part 4 of the exterior body 1, and squeeze the degassing part 4 by the roller 13, the cutter 14 causes the cutting edge to project to the operation position and to make the incision in the degassing part 4 of the exterior body 1. Then, the cutting edge moves in the lateral direction along the through hole 11A of the locking pad 11, makes the lateral incision in the degassing part 4, and forms the degassing hole 5 by the incision in the degassing part 4. It is supposed that the through hole 11A has such a width that accumulation of the electrolytic solution is not caused, and that the cutter 14 has such a thickness that the the cutter 14 can pass through the through hole 11A. Thus, the degassing hole 5 is formed while the overlapped exterior body films are brought into contact with each other.

Figure 6:
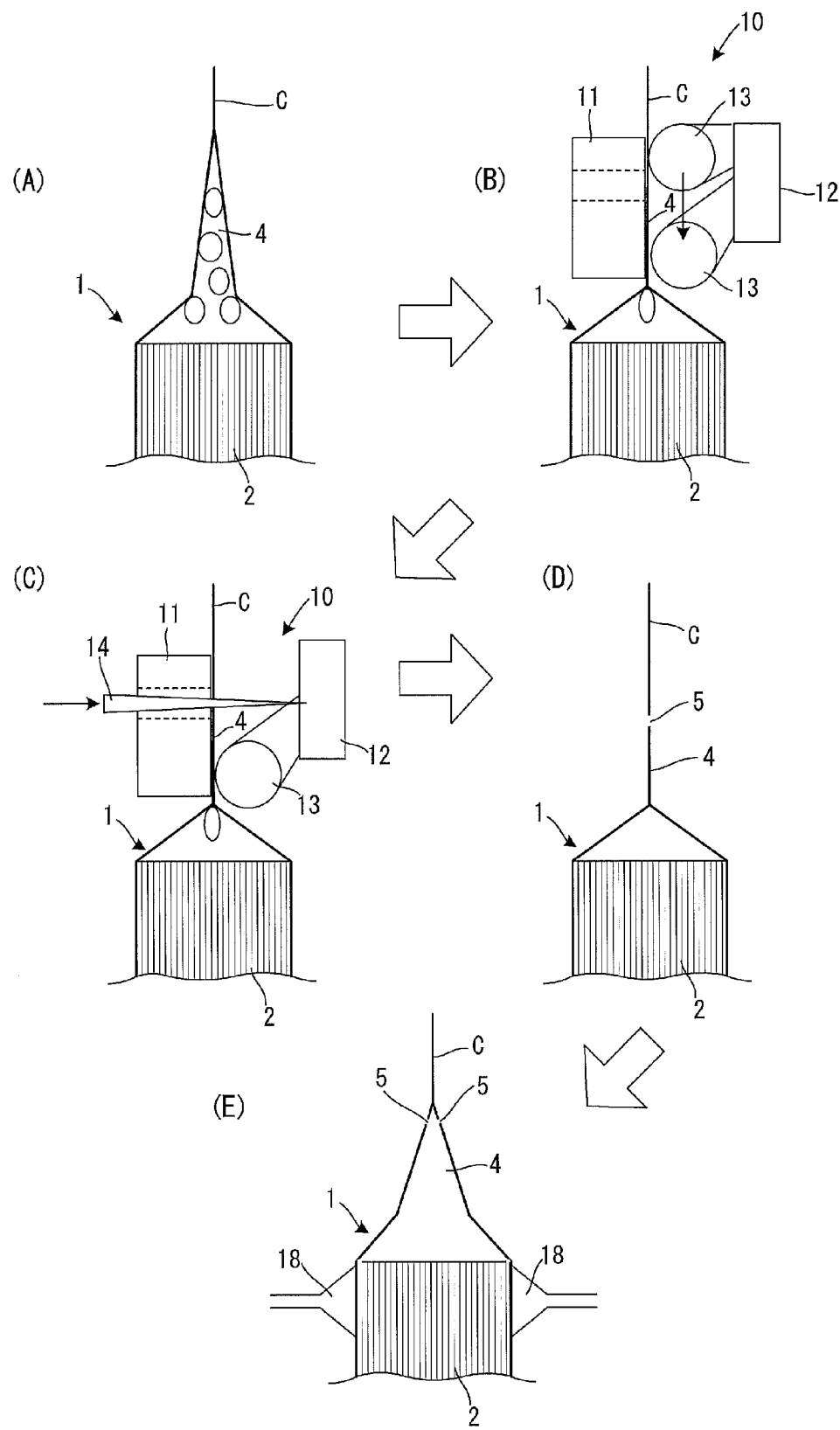
FIG. 6 are explanatory diagrams for explaining a hole forming process.

FIG. 6 illustrate the process of a hole forming operation by the hole forming device 10. In the exterior body 1 of the secondary battery, in which the gas is generated by the conditioning process, as illustrated in FIG. 6(A), the electrolytic solution remains in the degassing part 4 due to the increase in the internal pressure by the gas. It should be noted that, although the degassing part 4 is slightly bulged due to the internal pressure of the exterior body 1, an explanation will be given to the state where the bulge does not present, as illustrated, since the explanation is about the process of hole forming operation. As illustrated in FIG. 6(B), the hole forming device 10 causes the locking pad 11 and the sandwiching body 12 to move to the operation positions, and causes the locking pad 11 and the sandwiching body 12 to sandwich the degassing part 4 of the exterior body 1. The roller 13 of the sandwiching body 12, which sandwiches the degassing part 4 with the locking pad 11, squeezes the degassing part 4 and moves down to the power generation element 2 side, as described above. This causes the degassing part 4 to be crushed by the locking pad 11 and the roller 13, and the electrolytic solution that remains inside to be returned into the power generation element 2. The returned electrolytic solution combines with the electrolytic solution near the power generation element 2. Thus, gas-liquid separation between the gas and the electrolytic solution is facilitated.

Next, as illustrated in FIG. 6(C), the cutting edge of the cutter 14 is pressed out by penetrating through the through hole 11A of the locking pad 11 and makes the incision in the degassing part 4 of the exterior body 1. Then, the cutting edge moves in the lateral direction along the through hole 11A of the locking pad 11, makes the incision in the lateral direction in the degassing part 4, forms the degassing hole 5 by the incision in the degassing part 4, and thereafter, retreats to the position behind the locking pad 11 and returns to the standby position. Next, the locking pad 11 and the sandwiching body 12 are returned to the standby positions. Incidentally, the case of forming the degassing hole 5 by making the incision only in the degassing part 4 by the cutter 14 has been explained according to the above-described configuration. However, the incision may be made not only to the degassing part 4, but also to its extension part, so as to cut off the tip end side from the exterior body 1.

Figure 7:
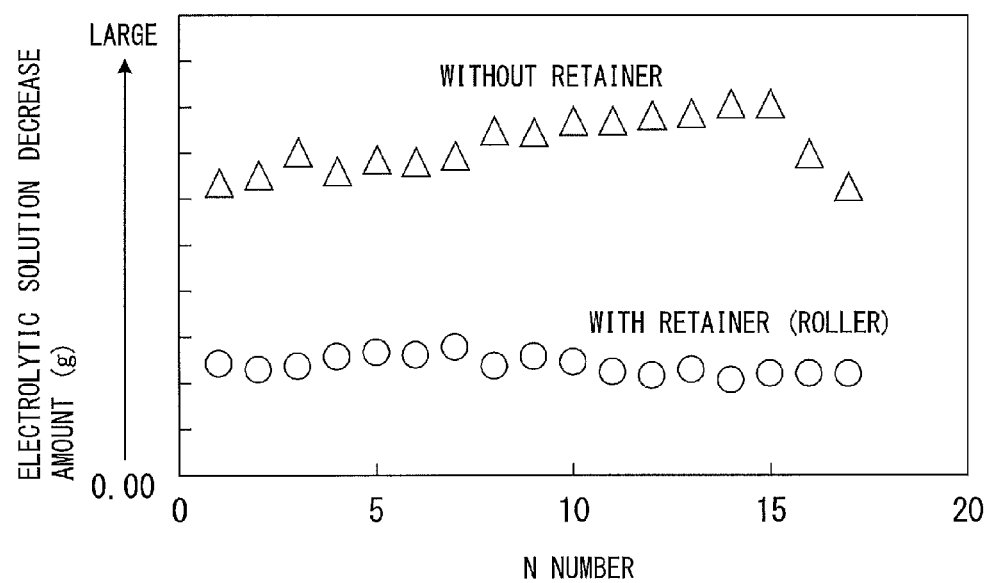
FIG. 7 is a graph illustrating experimental results of a decrease amount of an electrolytic solution, compared between the embodiment in which the hole forming device is used and a comparative example in which the hole forming device is not used.

FIG. 7 illustrates comparisons of a decrease amount of the electrolytic solution that is reduced by being scattered to the outside, between the secondary battery of this embodiment that uses the hole forming device 10 when forming the degassing hole 5 in the degassing part 4 by the cutter 14, and the secondary battery of the comparative example that does not use the hole forming device 10. As illustrated in FIG. 7, the comparative example, in which the degassing hole 5 is formed while the electrolytic solution remains in the degassing part 4, has such result that the decrease amount of the electrolytic solution is relatively large as the electrolytic solution jumps out simultaneously with the formation of the degassing hole 5. On the contrary, this embodiment, in which the degassing hole 5 is formed after the electrolytic solution that remains in the degassing part 4 is returned to the power generation element 2 side by the hole forming device 10, can substantially reduce the electrolytic solution that jumps out simultaneously with the formation of the degassing hole 5.

In the state as illustrated in FIG. 6(D), the electrolytic solution does not remain in the degassing part 4. Then, as illustrated in FIG. 6(E), regions of the exterior body 1 that are adjacent to the degassing part 4 and that store the power generation element 2 are sucked by suction pads 18 so that the regions are separated from each other. This suck causes a part of the exterior body 1 (only a central part) on the root side of the degassing part 4 to be separated from each other. Accordingly, the crushed degassing part 4 is enlarged, and the opening by the degassing hole 5 is increased. At this time, the sucked central part of the exterior body 1 is sucked, bulged, and partially separated from the power generation element 2, but the bulge of the exterior body 1 is not caused on both sides of the corresponding position. Thus, there is no such influence that the lamination state of the power generation element 2 breaks down. Thereby, the gas that exists in the exterior body 1, by being separated from the electrolytic solution, can be discharged to the outside through the enlarged degassing part 4 and the enlarged degassing hole 5.

Figure 8A:
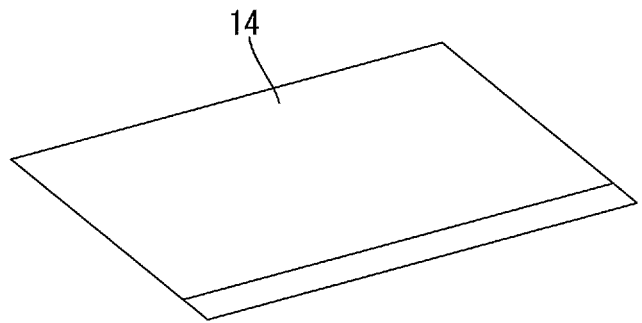
FIG. 8A is an explanatory diagram for explaining the shape of a cutting edge of a cutter for forming a degassing hole according to this embodiment.
Figure 8B:
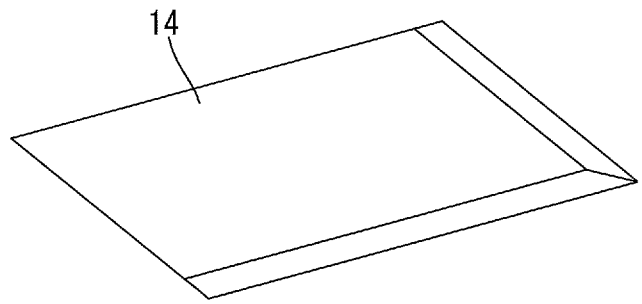
FIG. 8B is an explanatory diagram for explaining the shape of the cutting edge of the cutter for forming the degassing hole according to this embodiment.

As illustrated in FIG. 8A, the cutting edge used for the hole forming process may be provided only on the edge on one side from its sharp end, so as to cut the degassing part 4 when it is moved along the through hole 11A of the locking pad 11. However, when the cutting edge is provided on the edges on both sides from its sharp end, as illustrated in FIG. 8B, the cutting edges on both sides cut the degassing part 4 to both sides when the cutting edges are projected to the operation position, which makes it possible to make the incision in the degassing part 4 more efficiently. In addition, it is possible to obtain the degassing hole 5 having the neat shape, as the edges of the formed degassing hole 5 do not curl up.

Next, the secondary battery is transferred into a vacuum chamber in an atmospheric pressure state, and is subjected to the degassing process and the second sealing process. In the degassing process, the secondary battery in the state of FIG. 6(E), in which the degassing part 4 is opened by the degassing hole 5, is allowed to be in a vacuum state by decompressing the atmosphere, so that the gas, dissolved in the electrolytic solution, can be separated from the electrolytic solution and discharged quickly to the outside.

Next, in the vacuum atmosphere, the position closer to the power generation element 2 from the first sealing part C is joined by heat fusion so as to form the second sealing part D (second sealing process), as illustrated in FIG. 1.

After the second sealing process, the secondary battery is then taken out from the vacuum atmosphere, and is subjected to the practical sealing that joins the portion wider than the second sealing part D by the heat welding (practical sealing process, refer to the sealing part E in FIG. 1). Next, a trimming process is performed to cut unnecessary regions at the periphery of the exterior body 1, an inspection process, and a delivery adjusting process, such as charge and discharge and the like, is performed. Thus, the secondary battery is finished.

Figure 9:
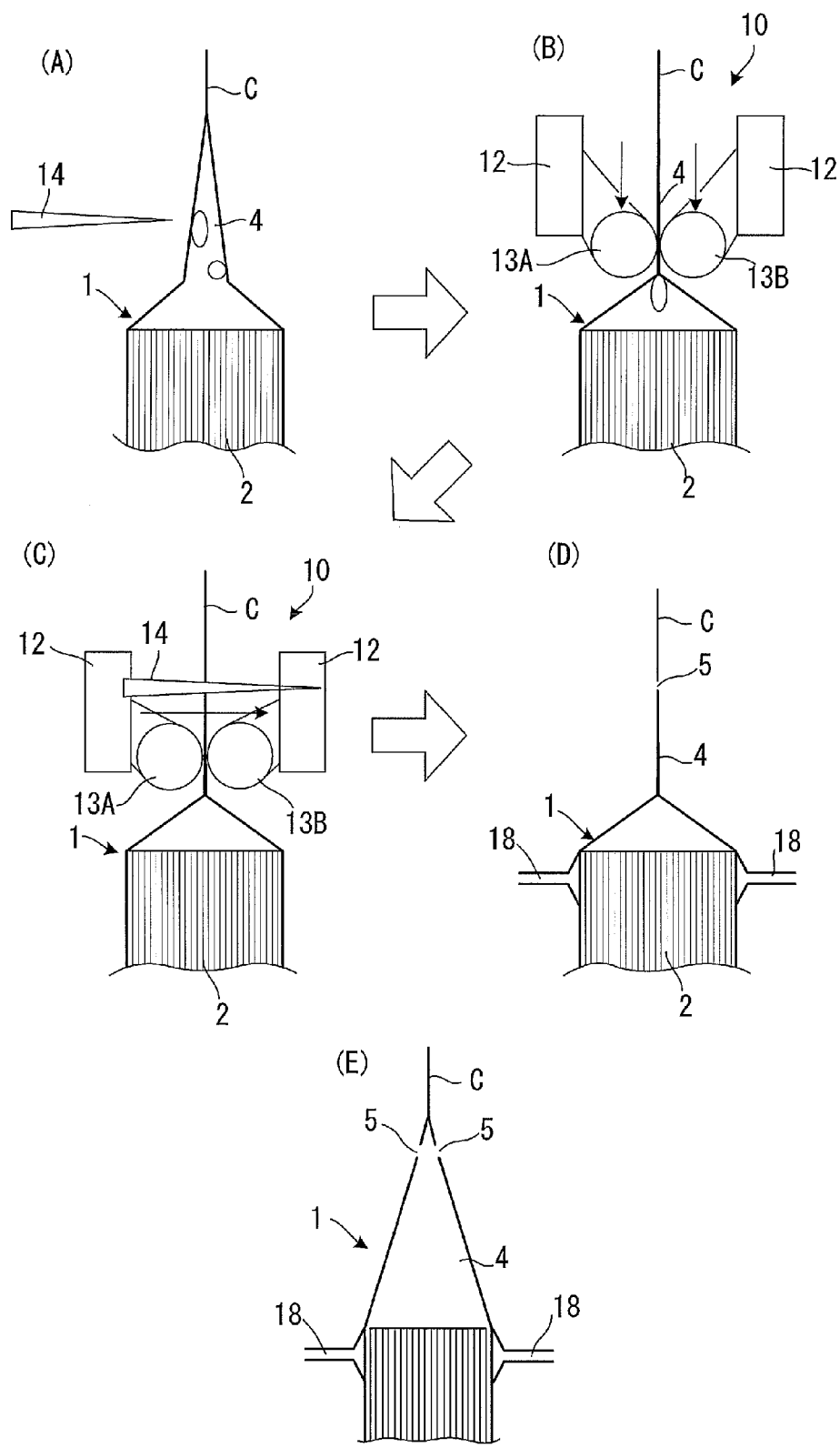
FIG. 9 are explanatory diagrams for explaining the hole forming process by the hole forming device of a second example.

FIG. 9 illustrate the hole forming process by the hole forming device 10 of a second example. Instead of the locking pad 11 of the hole forming device 10 of the first example, which is arranged to face one side of the degassing part 4 of the exterior body 1, the hole forming device 10 of the second example uses sandwiching bodies 12 that support rollers 13 to be able to swing. Namely, this hole forming device 10 is provided with a pair of the sandwiching bodies 12, each of which faces either side of the degassing part 4 of the exterior body 1 and supports a roller 13A or a roller 13B to be able to swing, and the cutter 14 that makes the incision in the degassing part 4 to form the degassing hole 5. Other configurations are the same as those of the hole forming device 10 of the first example.

As illustrated in FIG. 9(A), in the exterior body 1 of the secondary battery, in which the gas is generated in the conditioning process, the electrolytic solution remains in the degassing part 4 due to the increase in the internal pressure by the gas. As illustrated in FIG. 9(B), the hole forming device 10 causes the pair of sandwiching bodies 12 to move to the operation positions, and causes the pair of sandwiching bodies 12 to sandwich the degassing part 4 of the exterior body 1. Namely, the rollers 13A and 13B of the sandwiching bodies 12 sandwich the degassing part 4 in such a manner that the exterior films are brought into contact with each other, and move down to the power generation element 2 side while squeezing the degassing part 4, as described above. Thereby, the degassing part 4 is crushed by the pair of rollers 13, and the electrolytic solution, remaining in its internal space, is pressed down into the power generation element 2. After being pressed-down, the electrolytic solution combines with the electrolytic solution near the power generation element 2. Thus, the gas-liquid separation between the gas and the electrolytic solution is facilitated.

Next, as illustrated in FIG. 9(C), the cutting edge of the cutter 14 is pressed out and makes the incision in the degassing part 4 of the exterior body 1. Then, the cutting edge moves in the lateral direction, makes the lateral incision in the degassing part 4, forms the degassing hole 5 by the incision in the degassing part 4, and thereafter, retreats backward and returns to the standby position. Next, the pair of sandwiching bodies 12 is returned to the standby positions.

In this state, the electrolytic solution does not remain in the degassing part 4, and the degassing part 4 is kept crushed. For this reason, even when the degassing hole 5 is formed in the degassing part 4 by the cutter 14, the gas inside is not discharged easily, and the electrolytic solution inside can be prevented from jumping to the outside.

Next, as illustrated in FIG. 9(D), regions of the degassing part 4 are sucked by the suction pads 18 so that the regions are separated from each other. This suck causes the degassing hole 5 part to be separated from each other, as illustrated in FIG. 9(E). Thereby, in the degassing process, the most part of which will be described later, the gas that exists in the exterior body 1 can be discharged to the outside through the enlarged degassing part 4 and the enlarged degassing hole 5.

Next, the secondary battery is transferred into the vacuum chamber in the atmospheric pressure state, and is subjected to the degassing process and the second sealing process. In the degassing process, the secondary battery in the state of FIG. 9(E), in which the degassing part 4 is opened by the degassing hole 5, is allowed to be in the vacuum state by decompressing the atmosphere, so that the gas can be discharged quickly to the outside.

Next, in the vacuum atmosphere, the position closer to the power generation element 2 from the first sealing part C is joined by the heat fusion so as to form the second sealing part D (second sealing process), as illustrated in FIG. 1. After the second sealing process, the secondary battery is then taken out from the vacuum atmosphere, and is subjected to the practical sealing that joins the portion wider than the second sealing part D by the heat welding (practical sealing process, refer to the sealing part E in FIG. 1). Next, the trimming process is performed to cut the unnecessary regions at the periphery of the exterior body 1, the inspection process, and the delivery adjusting process, such as the charge and discharge and the like, is performed. Thus, the secondary battery is finished.

The following effects can be obtained according to this embodiment.

(1) As a precondition, provided is the manufacturing method of the secondary battery including the first sealing process that stores the power generation element 2 inside the exterior body 1 formed by the overlapped exterior films and that seals the exterior body 1 at the first sealing part C, the power generation element 2 being arranged with a space from at least a part of the first sealing part C, and the conditioning process that performs the conditioning of the power generation element 2. In addition, the manufacturing method of the secondary battery includes the hole forming process that forms the degassing hole 5 between the first sealing part C and the power generation element 2, and the second sealing process that seals the degassing hole 5. The hole forming process is characterized in that it includes the pressing process that presses, from both sides of the exterior body 1, the portion where the degassing hole 5 is formed in the exterior body 1 so that the overlapped exterior films are brought into contact with each other, before the degassing hole 5 is formed in the exterior body 1. Namely, as the degassing hole 5 is formed by moving the electrolytic solution near the portion where the degassing hole 5 is formed in the exterior body 1, it is possible to prevent the leakage of the electrolytic solution remaining near the degassing hole 5. Further, it is possible to suppress the increase in the manufacturing costs caused by the electrolytic solution attached onto the surface of the exterior body 1.

(2) In the pressing process, one side of the portion where the degassing hole 5 is formed is supported by the locking pad 11, the roller 13 is pressed against another side on a side separated from the power generation element 2, and the roller 13 is rolled toward the power generation element 2 side, so that the electrolytic solution is moved to the power generation element 2 side. Namely, as the degassing part 4 is squeezed by the locking pad 11 and the roller 13, the electrolytic solution remaining in the degassing part 4 can be returned to the power generation element 2 side without fail. Further, as the degassing part 4 is supported by the locking pad 11, the formation of the degassing hole 5 in the degassing part 4 by the cutter 14 is facilitated.

(3) In the pressing process, the portion where the degassing hole 5 is formed, at a position separated from the power generation element 2, is sandwiched by the pair of rollers 13, and the pair of rollers 13 is rolled toward the power generation element 2 side. Namely, as the degassing part 4 is squeezed by the pair of rollers 13, the electrolytic solution existing in the degassing part 4 can be moved to the power generation element 2 side without fail, and the leakage of the electrolytic solution at the time of forming the degassing hole 5 can be reduced.

(4) The cutter 14, forming the degassing hole 5, is arranged behind the locking pad 11, and the locking pad 11 is provided with the through hole 11A through which the cutting edge of the cutter 14 passes so as to introduce the cutting edge of the cutter 14 in the portion where the degassing hole 5 is formed. Therefore, the degassing hole 5 can be formed in the degassing part 4 within the range supported by the locking pad 11.

(5) The cutting edge of the cutter 14 is formed to have double edges that widen from its tip toward both sides, and enlarges its incision as it moves toward the portion where the degassing hole 5 is formed, so as to form the degassing hole 5. Therefore, only by projecting the cutter 14 to the degassing part 4, it is possible to form the incision for the degassing hole 5 in the degassing part 4, to increase the incision smoothly, and to obtain the degassing hole 5 having the neat shape, without the curling-up of the edges.

(6) After the degassing hole 5 is formed, the pressed exterior films near the degassing part 4 are separated by the suction pads 18. This makes it possible to change the state where the exterior films are brought into contact with each other (the state where the degassing is difficult) into the state where the degassing can be made easily.

Second Embodiment

Figure 10:
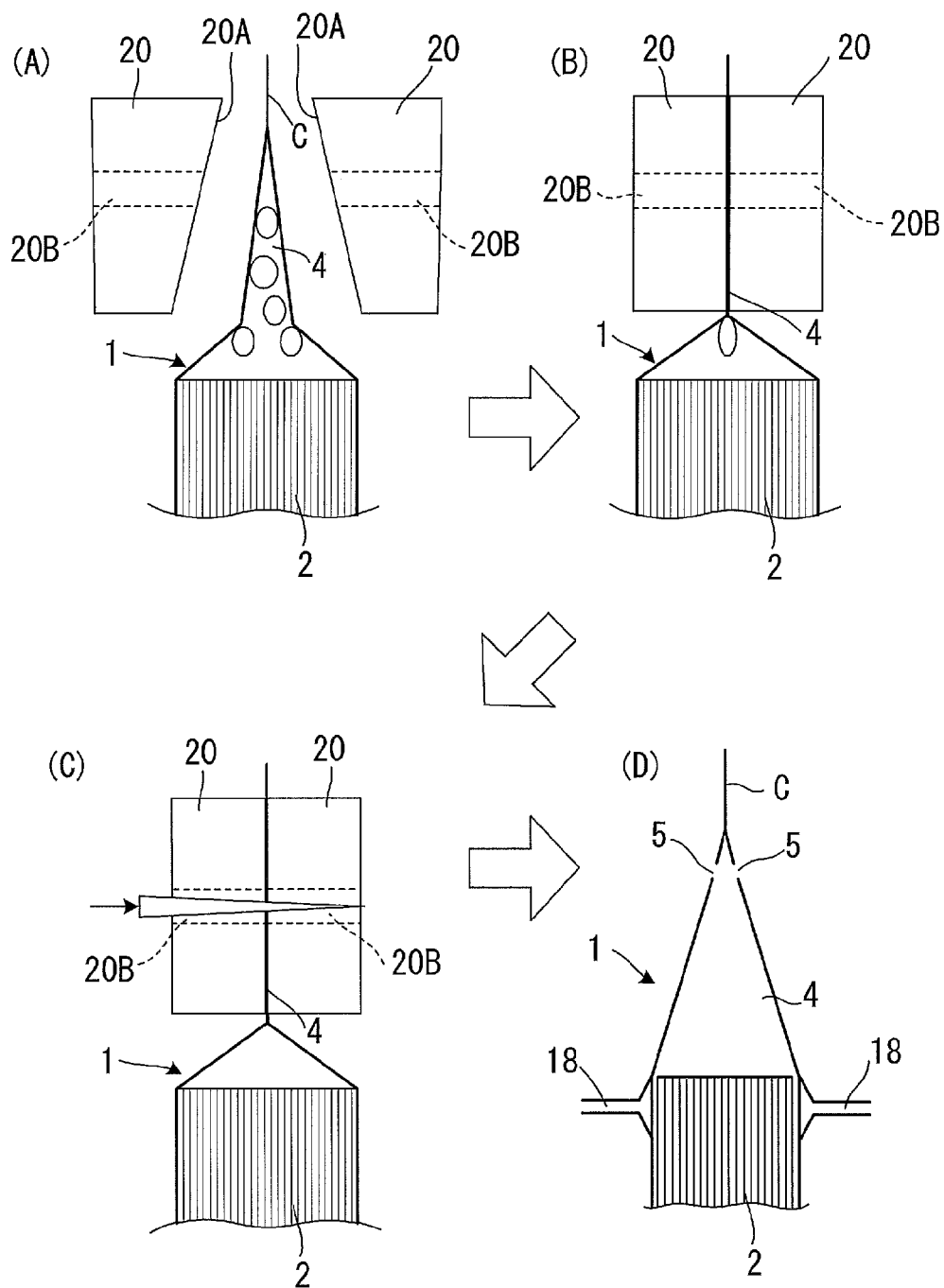
FIG. 10 are side views for explaining operation states of the hole forming device of the manufacturing method and the manufacturing device of the secondary battery according to a second embodiment of the present invention.

FIG. 10 are explanatory diagrams illustrating the hole forming process according to a second embodiment of the manufacturing method and the manufacturing device of the secondary battery, to which the present invention is applied. With regard to the hole forming device of this embodiment, such a configuration is added to the first embodiment that the remaining electrolytic solution is pressed back to the power generation element side by sandwiching the degassing part of the exterior body by elastic pads, each having an inclined surface. Incidentally, the same reference numerals are given to designate the same devices as those of the first embodiment, and explanations thereof are simplified or omitted.

The hole forming device 10 of this embodiment, as illustrated FIG. 10(A), is provided with a pair of elastic pads 20, each of which is formed by an elastic body, such as a sponge body, that faces either side of the degassing part 4 of the exterior body 1 and that is formed to have an inclined opposing surface. The illustrated elastic pads 20 are in the standby positions. The opposing surfaces of the opposing elastic pads 20 are provided with inclined surfaces 20A that come closer to each other at the tip side of the degassing part 4 and that are separated from each other at the root side of the degassing part 4. At the center of the pair of elastic pads 20, through holes 20B as slits extending in the lateral direction are formed. Similarly to the first embodiment, the cutting edge of the cutter 14 penetrates through holes 20B, so as to make the incision in a region facing the degassing part 4 and to form the degassing hole 5. Other configurations are the same as those of the first embodiment.

Incidentally, the cutting edge of the cutter 14 used for the hole forming process may be provided only on the edge on one side from its tip end, as illustrated in FIG. 8A, so as to cut the degassing part 4 when it is moved along the through holes 20B of the elastic pads 20. However, when the cutting edges are provided on the edges on both sides from its tip end, as illustrated in FIG. 8B, the cutting edges on both sides cut the degassing part 4 to both sides when the cutting edges are projected to the operation position, which makes it possible to make the incision in the degassing part 4 more efficiently.

In the exterior body 1 of the secondary battery, in which the gas is generated by the conditioning process, as illustrated in FIG. 10(A), the electrolytic solution remains in the degassing part 4 due to the increase in the internal pressure by the gas. As illustrated in FIG. 10(B), the hole forming device 10 causes the pair of elastic pads 20 to move to the operation positions, and causes the pair of elastic pads 20 to sandwich the degassing part 4 of the exterior body 1. The opposing surfaces of the pair of elastic pads 20 are the inclined surfaces 20A. The tip side of the degassing part 4 is sandwiched, and a sandwiching range is gradually increased toward the root side of the degassing part 4. As the sandwiching range is increased, the width dimension of the degassing part 4 is reduced from the tip side toward the root side. This causes the degassing part 4 to be narrowed and crushed, and the electrolytic solution remaining in the degassing part 4 to be pressed back to the inside of the power generation element 2. After being pressed-back, the electrolytic solution combines with the electrolytic solution near the power generation element 2. Thus, the gas-liquid separation between the gas and the electrolytic solution is facilitated.

Next, as illustrated in FIG. 10(C), the cutting edge of the cutter 14 is pressed out and makes the incision in the degassing part 4 of the exterior body 1. Then, the cutting edge moves in the lateral direction, makes the lateral incision in the degassing part 4, forms the degassing hole 5 by the incision in the degassing part 4, and thereafter, retreats backward and returns to the standby position. Next, the pair of elastic pads 20 is returned to the standby positions.

In this state, the electrolytic solution does not remain in the degassing part 4, and the degassing part 4 is kept crushed. For this reason, the electrolytic solution in its inside can be prevented from jumping to the outside.

Then, as illustrated in FIG. 10(D), regions of the exterior body 1 that are adjacent to the degassing part 4 and that store the power generation element 2 are sucked by the suction pads 18 so that the regions are separated from each other, similarly to the first example. This suck causes a part of the exterior body 1 (only the central part) on the root side of the degassing part 4 to be separated from each other. Accordingly, the crushed degassing part 4 is enlarged, and the opening by the degassing hole 5 is increased. At this time, the sucked central part of the exterior body 1 is sucked, bulged, and partially separated from the power generation element 2, but the bulge of the exterior body 1 is not caused on both sides of the corresponding position. Thus, there is no such influence that the lamination state of the power generation element 2 breaks down. Thereby, the gas that exists in the exterior body 1, by being separated from the electrolytic solution, can be discharged to the outside through the enlarged degassing part 4 and the enlarged degassing hole 5.

Next, the secondary battery is transferred into the vacuum chamber in the atmospheric pressure state, and is subjected to the degassing process and the second sealing process, similarly to the first embodiment. In the degassing process, the secondary battery in the state of FIG. 10(D), in which the degassing part 4 is opened by the degassing hole 5, is allowed to be in the vacuum state by decompressing the atmosphere, so that the gas, dissolved in the electrolytic solution, can be separated from the electrolytic solution, and discharged quickly to the outside.

Next, in the vacuum atmosphere, the position closer to the power generation element 2 from the first sealing part C is joined by the heat fusion so as to form the second sealing part D (second sealing process), as illustrated in FIG. 1.

The following effects, in addition to the effects (1) to (5) of the first embodiment, can be obtained according to this embodiment.

(7) In the pressing process, the portion where the degassing hole 5 is formed is sandwiched from both sides by the elastic pads 20 having the inclined surfaces 20A that are inclined, that come closer to each other on a side separated from the power generation element 2, and that are separated from each other on a closer side, so that the electrolytic solution is moved to the power generation element 2 side. Namely, the degassing part 4 is crushed only by sandwiching the degassing part 4 by the elastic pads 20. Due to its simple configuration, cost-reduction can be realized. In addition, as the degassing hole 5 is formed in the degassing part 4 by holding the degassing part 4 from both surfaces, such effects can be obtained that the position of the degassing part 4 is stabilized, and the formation of the degassing hole 5 is facilitated.

(8) The cutter 14 for forming the degassing hole 5 is arranged behind the elastic pads 20, and each elastic pad 20 is provided with the through hole 20B through which the cutting edge of the cutter 14 passes so as to introduce the cutting edge of the cutter 14 in the portion where the degassing hole 5 is formed. Thereby, the degassing hole 5 can be formed in the degassing part 4 within the region supported by the elastic pads 20.

The embodiments of the present invention have been explained thus far. However, the above-described embodiments are only a part of application examples of the present invention, and are not intended to limit the technical scope of the present invention to the concrete configurations of the above-described embodiments.

The present application claims priority to Japanese Patent Application No. 2012-131878, filed in the Japan Patent Office on Jun. 11, 2012. The contents of this application are incorporated herein by reference in their entirety.

The invention claimed is:

1. A manufacturing method of a secondary battery comprising:
   a first sealing process that stores a power generation element inside an exterior body formed by overlapped exterior films and that seals the exterior body at a first sealing part, the power generation element being arranged with a space from at least a part of the first sealing part;
   a conditioning process that performs conditioning of the power generation element;
   a hole forming process that forms a degassing hole between the first sealing part and the power generation element; and
   a second sealing process that seals the degassing hole,
   wherein the hole forming process comprises a pressing process that presses, from both sides of the exterior body when the exterior body is in a substantially vertical position, a portion where the degassing hole is formed in the exterior body so that the overlapped exterior films are brought into contact with each other, before the degassing hole is formed in the exterior body.

2. The manufacturing method of the secondary battery according to claim 1, wherein, in the pressing process, one side of the portion where the degassing hole is formed is supported by a locking pad, a roller is pressed against another side on a side separated from the power generation element, and the roller is rolled toward a power generation element side, so that an electrolytic solution is moved to the power generation element side.

3. The manufacturing method of the secondary battery according to claim 1, wherein, in the pressing process, the portion where the degassing hole is formed, at a position separated from the power generation element, is sandwiched by a pair of rollers, and the pair of rollers is rolled toward a power generation element side.

4. The manufacturing method of the secondary battery according to claim 1, wherein, in the pressing process, the portion where the degassing hole is formed is sandwiched from both sides by elastic pads having inclined surfaces that are inclined, that come closer to each other on a side separated from the power generation element, and that are separated from each other on a closer side, so that an electrolytic solution is moved to a power generation element side.

5. The manufacturing method of the secondary battery according to claim 1, further comprising:
   a process of separating the pressed exterior films near the degassing hole, between the hole forming process and the second sealing process.

6. A manufacturing device of a secondary battery for manufacturing the secondary battery that stores a power generation element inside an exterior body formed by overlapped exterior films, that degasses, from a degassing hole, gas generated by performing conditioning of the power generation element, and that seals the degassing hole, the manufacturing device comprising:
   a pressing device configured to press, from both sides of the exterior body, the exterior films so that the exterior films, in which the degassing hole is formed, are brought into contact with each other; and
   a hole forming device configured to form the degassing hole in the exterior films that are brought into contact with each other by the pressing device, wherein the pressing device is configured to support one, side of a portion where the degassing hole is formed by a locking pad, press a roller against another side on a side separated from the power generation element, and roll the roller toward a power generation element side, so that an electrolytic solution is moved to the power generation element side.

7. The manufacturing device of the secondary battery according to claim 6,
   wherein the hole forming device comprises a cutter,
   wherein the cutter is arranged behind the locking pad, and
   wherein the locking pad is provided with a through hole through which a cutting edge of the cutter passes so as to introduce the cutting edge of the cutter in the portion where the degassing hole is formed.

8. A manufacturing device of a secondary battery for manufacturing the secondary battery that stores a power generation element inside an exterior body formed by overlapped exterior films, that degasses, from a degassing hole, gas generated by performing conditioning of the power generation element, and that seals the degassing hole, the manufacturing device comprising:
   a pressing device configured to press, from both sides of the exterior body, the exterior films so that the exterior films, in which the degassing hole is formed, are brought into contact with each other; and
   a hole forming device configured to form the degassing hole in the exterior films that are brought into contact with each other by the pressing device, wherein the pressing device is configured to sandwich a portion where the degassing hole is formed, at a position separated from the power generation element, by a pair of rollers, and roll the pair of rollers toward a power generation element side.

9. A manufacturing device of a secondary battery for manufacturing the secondary battery that stores a power generation element inside an exterior body formed by overlapped exterior films, that degasses, from a degassing hole, gas generated by performing conditioning of the power generation element, and that seals the degassing hole, the manufacturing device comprising:
   a pressing device configured to press, from both sides of the exterior body, the exterior films so that the exterior films, in which the degassing hole is formed, are brought into contact with each other; and
   a hole forming device configured to form the degassing hole in the exterior films that are brought into contact with each other by the pressing device, wherein the pressing device is configured to sandwich a portion where the degassing hole is formed from both sides by elastic pads having inclined surfaces that are inclined, that come closer to each other on a side separated from the power generation element, and that are separated from each other on a closer side, so that an electrolytic solution is moved to a power generation element side.

10. The manufacturing device of the secondary battery according to claim 9,
    wherein the hole forming device comprises a cutter,
    wherein the cutter is arranged behind the elastic pads, and
    wherein each elastic pad is provided with a through hole through which a cutting edge of the cutter passes so as to introduce the cutting edge of the cutter in the portion where the degassing hole is formed.

11. The manufacturing device of the secondary battery according to claim 9,
wherein the hole forming device comprises a cutter, and
wherein a cutting edge of the cutter is formed to have double edges that widen from its tip toward both sides, and is configured to enlarge an incision as it moves toward the portion where the degassing hole is formed, so as to form the degassing hole.

* * * * *

UNITED STATES PATENT AND TRADEMARK OFFICE
CERTIFICATE OF CORRECTION

PATENT NO. : 9,722,274 B2  
APPLICATION NO. : 14/405628  
DATED : August 1, 2017  
INVENTOR(S) : Nobuaki Akutsu et al.

It is certified that error appears in the above-identified patent and that said Letters Patent is hereby corrected as shown below:

On the Title Page

Column 1, (73) Assignee: "Nissan Motor Co., Ltd., Yokohama-shi, Kanagawa (JP)" should be -- Nissan Motor Co., Ltd., Yokohama-shi, Kanagawa (JP); Automotive Energy Supply Corporation, Zama-shi, Kanagawa (JP) --

Signed and Sealed this  
Seventh Day of November, 2017

Joseph Matal  
*Performing the Functions and Duties of the*  
*Under Secretary of Commerce for Intellectual Property and*  
*Director of the United States Patent and Trademark Office*